United States Patent [19]
Karni

[11] Patent Number: 5,907,574
[45] Date of Patent: May 25, 1999

[54] HIGH POWER INFRARED LASER SYSTEM

[75] Inventor: Ziv Karni, Kfar Shemaryahu, Israel

[73] Assignee: Esc Medical Systems Ltd., Yokneam, Israel

[21] Appl. No.: 08/665,930

[22] Filed: Jun. 19, 1996

[51] Int. Cl.$^6$ ..................................................... H01S 3/08
[52] U.S. Cl. .............................. 372/95; 372/66; 372/103
[58] Field of Search ........................... 372/40, 41, 95, 372/101, 103, 66

[56] References Cited

U.S. PATENT DOCUMENTS

| | | | |
|---|---|---|---|
| 3,680,000 | 7/1972 | Chesler | 372/66 |
| 4,633,479 | 12/1986 | Trageser | 372/95 |
| 5,202,898 | 4/1993 | Sugawara et al. | 372/101 |
| 5,251,222 | 10/1993 | Hester | 372/101 |

*Primary Examiner*—Rodney Bovernick
*Assistant Examiner*—Robert E. Wise
*Attorney, Agent, or Firm*—Mark M. Friedman

[57] ABSTRACT

A surgical laser system is provided with improvements to allow it to operate at higher power levels without beam divergence. The improvements include a beam expansion telescope in the optical path of the beam and modifications to the optical cavity and the lasing medium. The modifications include imposing a negative curvature on one or both ends of the rod, configuring the optical cavity as a positive-branch unstable resonator, and providing at least one intra-cavity shutter.

7 Claims, 3 Drawing Sheets

HIGH POWER INFRARED LASER SYSTEM

FIELD AND BACKGROUND OF THE INVENTION

The present invention relates to a surgical laser system and, more particularly, to a solid-state laser system characterized by high average power and by near- to mid infra-red range of wavelengths.

A widely used class of surgical laser systems that operate in the near IR range is characterized by a solid-state laser and an articulated-arm beam transmission means. Solid-state lasers are described and explained in many publications—for example in "Solid State Laser Engineering" by Walter Koechner (2nd edition), Springer Publishing Co., 1988, which is incorporated by reference for all purposes as if fully set forth herein. Articulated-arm beam transmission is well-known in the art.

In this class of surgical laser systems the laser medium usually consists of Yttrium-Aluminum-Garnet (YAG), in which are imbedded rare earth dopant ions—typically Neodymium (Nd), Erbium (Er) or Holmium (Ho), respectively producing wavelengths of approximately 1, 3 or 2 microns. A typical articulated-arm beam transmission means (to be referred to, for brevity, as an arm) is about two meters long, includes seven mirrors to deflect the laser beam past the articulations, and has an internal diameter of 15 to 18 mm.

Input (or pumping-) power is usually supplied to the laser medium by radiation from an external light source, such as an arc lamp (in which case the input power and the laser beam are continuous) or a flash lamp (in which case the laser operates in pulses).

The optical efficiency of the laser medium, that is, the ratio of laser power generated in the optical cavity to the light power fed into the laser medium, is relatively low—generally in the range of 0.1–5% and typically 1%. The excess input light power is converted to heat and acts to raise the temperature of the laser medium. Thus, for example, for a laser beam power level of 5 watts, the thermally absorbed power level is typically 5/0.01=500 watts. In order to keep the temperature at acceptable levels, the generated heat is conducted away from the laser medium rod—typically by means of a jacket of flowing water surrounding the rod. In the laser medium rod, heat is absorbed from the pumping light about evenly over any cross section, while heat loss to the cooling water takes place over the outer surface of the rod. Since the thermal conductivity of the rod material is low, this causes a very pronounced temperature gradient radially across the rod, which in turn causes differential elongation of the rod—the region near its axis being longer than the peripheral region—resulting in convex end surfaces of the rod, which thus function as positive lenses. This phenomenon is called "thermal lensing".

Because of this thermal lensing, the optical cavity mirrors must be placed as close as possible to the laser rod in order to maintain a stable optical resonator. The resulting relatively short optical cavity has a high Fresnel number, and therefore supports a high number of transverse modes. As a result, the beam of coherent light that emerges is highly divergent. The beam diameter at the tool end of the articulated arm therefore becomes large, possibly exceeding the internal aperture and causing vignetting of part of the beam and loss of power delivered to the target. The following numerical illustration is offered as a typical example: The exit beam is 6 mm in diameter and diverges at an angle of 20 milliradians; at the end of a 2-meter-long arm, the beam diameter becomes 6+0.02*2000=46 mm, which greatly exceeds the maximum internal diameter of a practical arm, which, as noted above, is about 18 mm.

In addition, when the laser is turned on, before the rod reaches thermal equilibrium, it may focus the beam on the optical cavity mirrors, thereby damaging those mirrors.

The effects described hereabove limit the practical operating power level of surgical laser systems of prior art, resulting in a maximum beam power of about 5 to 10 watts at the exit aperture of the articulated arm.

In surgical laser systems of prior art, alleviation of the problem of beam divergence has been attempted by simply shortening the length of the articulated arm. This has a severe disadvantage in that it limits the range of tool motion and of patient placement available to the surgeon. Alternatively widening the diameter of the last sections of the arm makes them heavy and more cumbersome. Another way suggested to alleviate the problem is to place a mode filter in the optical cavity, thus reducing the resultant beam divergence; this will, however, further reduce the efficiency of the laser.

One obvious solution of the problem of thermal lensing is to introduce a strongly negative lens into the optical cavity near each end of the rod, such that will nullify the positive thermal lens effect. This will, however, work only at one particular power level. In contrast, surgical laser systems are typically operable at widely varying power levels. If the negative lens is strong enough to nullify the effect of the thermal lens at maximum power level, then at lower power levels the optical divergence introduced by the negative lens will tend to decrease the efficiency of the laser and to raise the power input threshold at which lasing will occur at all.

There is thus a widely recognized need for, and it would be highly advantageous to have, a surgical solid-state based laser system that delivers through an easily manipulatable articulated arm a beam of 2–3 microns wavelength at varying power levels reaching well above those hitherto achievable, without damaging internal parts.

SUMMARY OF THE INVENTION

According to the present invention there is provided a laser system for delivering a beam of radiant energy through a remote aperture, including a rod of solid lasing medium, comprising means for reducing the divergence of the beam due to thermal effects.

According to further features in preferred embodiments of the invention described below, the means for reducing the beam divergence includes a beam expansion telescope in the optical path of the beam.

According to still further features in the described preferred embodiments, the means for reducing the beam divergence includes modifications to the optical cavity and the lasing medium. These modifications include imposing a negative curvature on one or both ends of the rod, configuring the optical cavity as a positive-branch unstable resonator, and providing an intra-cavity shutter.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a surgical solid-state based laser system that delivers through an easily manipulatable articulated arm a beam of 2–3 microns wavelength at varying power levels reaching well above those hitherto achievable.

Specifically, the present invention can be used to decrease the divergence of the beam exiting the laser, so as to pass losslessly through a long and thin articulated arm, and to overcome the effects of thermal lensing in general, avoiding thermal damage to intra-cavity mirrors in particular, so that operation at higher power levels becomes possible.

The principles and operation of a laser system according to the present invention may be better understood with reference to the drawings and the accompanying description.

Figure 1:
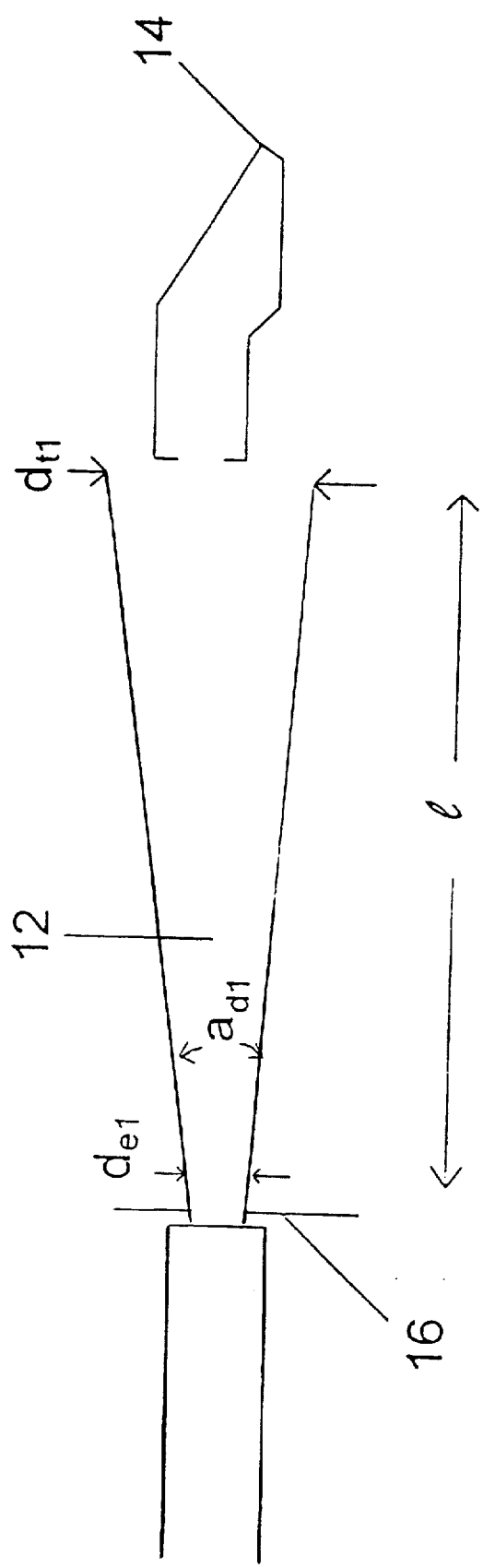
FIG. 1 (prior art) is a schematic illustration of the problem addressed by the present invention.
Figure 2:
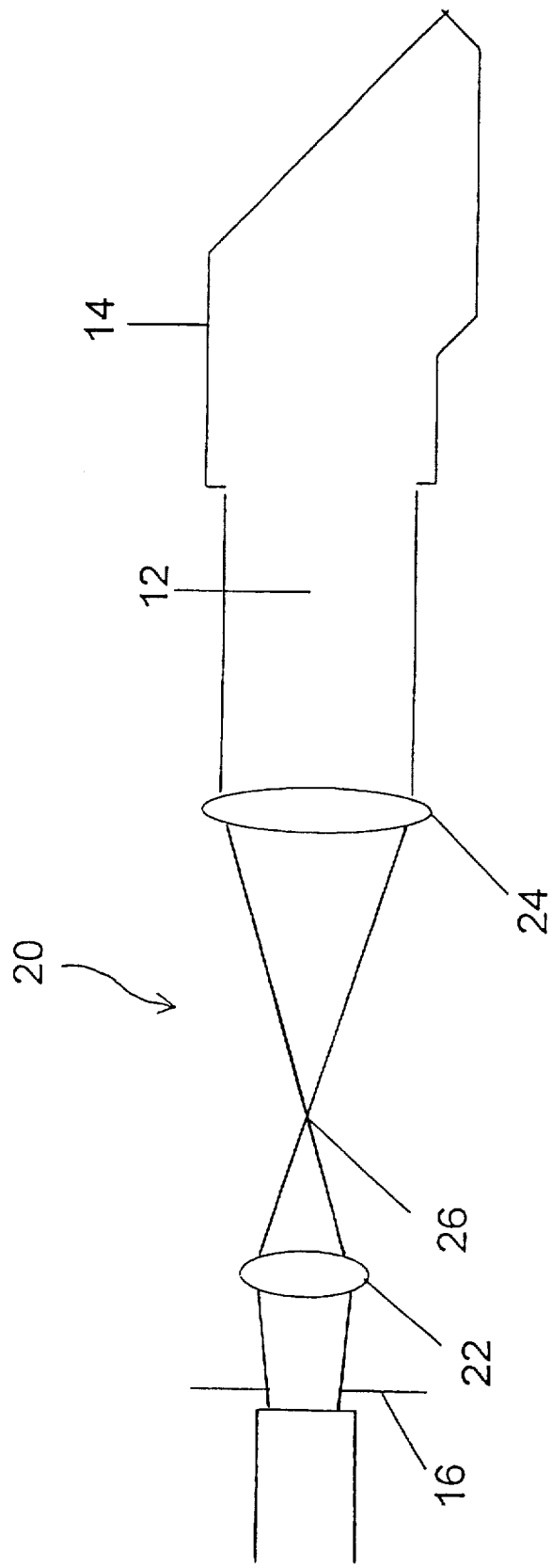
FIG. 2 is a schematic illustration of the effect of including a beam expansion telescope in the optical path of FIG. 1.

Referring now to the drawings, FIGS. 1 and 2 illustrate schematically the basic geometry of a collimated laser beam between the exit aperture of the laser and a remote aperture that represents the plane at which the articulated arm is coupled to the surgical tool. The beam is shown as unfolded (i.e. without the folding of the beam by the mirrors at the joints of the arm, which has no bearing on the effects being discussed). The distance between the two apertures, which is the length of the optical path through the arm, is denoted by l. FIG. 1 illustrates the case of a surgical system according to prior art. At an exit aperture 16, a beam 12 is seen to have a nominal diameter $d_{e1}$ and an angle of divergence $a_{d1}$. At the aperture near a tool 14, beam 16 has a nominal diameter of $d_{t1}$. Clearly these variables are related by: $d_{t1}=d_{e1}+la_{d1}$. Now it is well known that the divergence angle of a collimated beam is inversely related to its initial (i.e. exit) diameter; that is, generally $d_e a_d$ is constant. Therefore if $d_e$ is increased, $a_d$ will decrease proportionally. This is accomplished by a beam expansion telescope, which includes a pair of positive lenses arranged confocally along the optical axis of the beam. The ratio between the focal lengths of the two lenses, N, is equal to the factor of expansion of the beam diameter. This is shown in FIG. 2, where such a beam expansion telescope has been added to the optical scheme of FIG. 1. A beam expansion telescope 20 consists of a positive lens 22, with focal length $f_1$, and a positive lens 24, with focal length $f_2$, which have a common focus at 26. The laser exit beam diameter is again $d_{e1}$, whereas the beam diameter after lens 22 is $d_{e2}$. Clearly $d_{e2}/d_{e1}=N=f_2/f_1$. The beam divergence angle will now be $a_{d2}=a_{d1}/N$ and the beam diameter at the tool end will now be $$d_{t2}=d_{e2}+la_{d2}=Nd_{e1}+la_{d1}/N.$$

The value of N can now be determined so as to minimize the beam diameter $d_{t2}$ at the tool aperture 14. Using elementary calculus the relation for such a minimal beam diameter is found to be $sqrt(la_{d2}/d_{e2})$.

Figure 3:
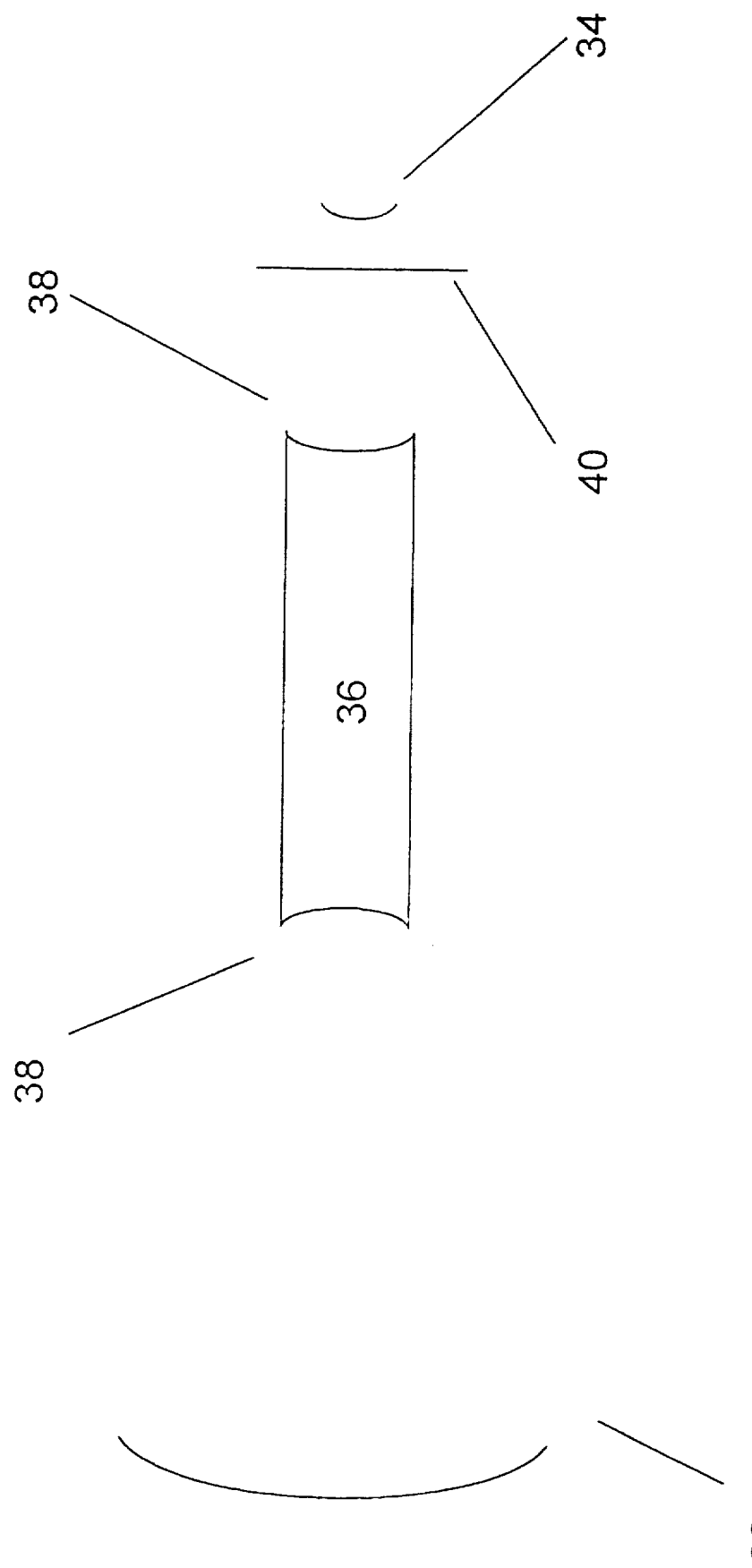
FIG. 3 is a schematic diagram of a modified optical cavity according to the present invention.

Reference is now made to FIG. 3, which shows schematically the optical cavity configured so as to correct the effects of thermal lensing. There is shown therein a pair of reflecting mirrors 32 and 34, at both ends of the cavity, which form an unstable optical resonator, to be explained herebelow, and a rod of laser medium 36. One or both ends 38 of rod 36 are ground to assume a concave surface, making it function as a negative lens. The curvature of these surfaces is chosen so as to partially offset the positive curvature, or lensing, caused by the thermal effects in rod 36 at maximum operating power level, and totally offset the lensing caused by the thermal effects in rod 36 at some intermediate operating power level. Thus, at some intermediate operating power level, ends 38 of rod 36 will be substantially planar and therefore no undue beam concentration will occur at the surfaces mirrors 32 and 34, and also the exit beam divergence will remain unaffected. Moreover, the resultant reduction in intra-cavity beam convergence alleviates the deleterious effect on generated power level, as described hereabove. The degree of negative curvature used is lower than the degree of negative curvature of the negative lens of the prior art. For this reason, the device of the present invention does not suffer from the side effects associated with the prior art; however, this often requires that other means for reducing divergence, including the beam expansion telescope and the unstable resonator of the present invention, be used as well.

Unstable optical resonators, in conjunction with solid-state lasers, are described in chapter 5.5 of Koechner's book. The present invention preferably utilizes the confocal positive-branch type of unstable resonator. Accordingly mirror 32 is concave and spans the whole beam, while mirror 34 is convex and its diameter is only a fraction of the beam diameter. As explained in the reference, in an unstable resonator high-order beam modes tend to diverge faster (i.e. over fewer round trips) than the lower order modes. Thus there is a mode filtering effect. As long as the laser amplification in the rod is high enough, there will occur a net power gain in the beam for the low-order modes. As a result, the inherent exit beam divergence is reduced and thus also the minimal beam diameter achievable at the far end of the articulated arm will be reduced.

In addition, the optical cavity is provided with at least one intracavity shutter 40, which remains closed until several hundred milliseconds after power is turned on. This prevents the laser beam from damaging mirrors 32 and 34 before rod 36 has reached thermal equilibrium.

In the most preferred embodiment of the present invention, all four means for coping with the deleterious effects of thermal lensing, to wit, a negative curvature on at least one of ends 38 of rod 36, a positive-branch unstable resonator such as is provided by mirrors 32 and 34, beam expansion telescope 20, and shutter 40, are used. Nevertheless, the scope of the present invention includes the use of any of the four means separately or in combinations of two or three of them.

While the invention has been described with respect to a limited number of embodiments, it will be appreciated that many variations, modifications and other applications of the invention may be made.

What is claimed is:

1. A laser system for delivering a beam of radiant energy through a remote aperture, including a rod of solid lasing medium, comprising means for reducing beam divergence including a negative curvature on at least one end of said rod, said means further including a positive-branch unstable resonator.

2. The laser system of claim 1, wherein said means further includes a beam expansion telescope.

3. The laser system of claim 2, further comprising at least one intra-cavity shutter.

4. The laser system of claim 1, further comprising at least one intra-cavity shutter.

5. A laser system for delivering a beam of radiant energy through a remote aperture, including a rod of solid lasing medium, comprising means for reducing beam divergence including a negative curvature on at least one end of said rod, said means further including a beam expansion telescope.

6. The laser system of claim 5, further comprising at least one intra-cavity shutter.

7. A laser system for delivering a beam of radiant energy through a remote aperture, including a rod of solid lasing medium, comprising means for reducing beam divergence including a negative curvature on at least one end of said rod; and further comprising at least one intra-cavity shutter.

* * * * *